United States Patent [19]
Meeker et al.

[11] Patent Number: 5,445,560
[45] Date of Patent: Aug. 29, 1995

[54] HYBRID END CLOSURE FOR SHIRRED FOOD CASING

[75] Inventors: Douglas K. Meeker, Catlin, Ill.; Scott J. Rossi, Brasschaat, Belgium; Keith A. Watts, Oak Brook, Ill.

[73] Assignee: Teepak, Inc., Westchester, Ill.

[21] Appl. No.: 193,974

[22] Filed: Feb. 9, 1994

[51] Int. Cl.⁶ ............................................. A22C 13/00
[52] U.S. Cl. ...................................... 452/39; 452/30; 138/118.1; 138/89; 426/140
[58] Field of Search ................ 452/39, 47, 48, 30, 452/35; 138/118.1, 89; 426/140

[56] References Cited

U.S. PATENT DOCUMENTS

| | | | |
|---|---|---|---|
| 3,162,893 | 12/1964 | Townsend | 17/34 |
| 3,274,005 | 9/1966 | Alsys | 99/176 |
| 3,383,222 | 5/1968 | Alsys et al. | 99/176 |
| 3,892,869 | 1/1975 | Sheridan et al. | 426/138 |
| 3,914,447 | 10/1975 | Turns et al. | 426/390 |
| 4,075,938 | 2/1978 | Martinek | 9.3/84 |
| 4,320,558 | 3/1982 | Martinek et al. | 17/42 |
| 4,339,894 | 7/1982 | Story et al. | 51/281 |
| 4,377,885 | 3/1983 | Kollross | 17/42 |
| 4,411,048 | 10/1983 | Green | 17/49 |
| 4,475,895 | 10/1984 | Martinek | 493/259 |
| 4,525,984 | 7/1985 | Kollross | 53/483 |
| 4,536,175 | 8/1985 | Arnold | 493/308 |
| 4,551,370 | 11/1985 | Nausedas | 428/36 |
| 4,585,680 | 4/1986 | Nausedas | 428/36 |
| 4,604,085 | 8/1986 | Martinek | 493/259 |
| 4,674,153 | 6/1987 | Nausedas | 17/49 |
| 4,693,280 | 9/1987 | Beardsley | 138/118.1 |
| 4,752,486 | 6/1988 | Niedenthal et al. | 426/118 |
| 4,792,047 | 12/1988 | Wood et al. | 264/138 |
| 5,088,956 | 2/1992 | Kollross | 452/32 |
| 5,131,883 | 7/1992 | Hendriks et al. | 452/21 |
| 5,238,443 | 8/1993 | Beardsley | 452/46 |
| 5,356,331 | 10/1994 | Madrigal-Ocegueda | 452/32 |

Primary Examiner—Willis Little
Attorney, Agent, or Firm—Michael L. Dunn

[57] ABSTRACT

The invention comprises a shirred food casing strand comprising tubular film food casing compressed along a longitudinal axis of the tubular film to form a compressed pleated strand. The strand has an internal longitudinal bore defined by sidewalls formed from said compressed tubular film. The bore has a first open end and the strand is provided with an end closure proximate a second end of the bore and which closes said bore proximate said second end. The end closure comprises a portion of said tubular film compressed within said bore proximate said second end. The compressed film portion has a vent therethrough. The compressed film portion tightly circumferentially contacts the walls of said bore at the location of the end closure and is hollow at one end of the compressed film portion and has an essentially flat surface at another end of the compressed film portion opposite the hollow end, said flat surface facing the first open end of said bore. In a preferred embodiment, the vent is defined by radially twisted tubular film and the balance of the end closure is formed from tubular film compressed along its longitudinal axis in the absence of significant radial twisting. The invention further comprises a method for manufacturing the hybrid end closure within a shirred tubular food casing strand.

4 Claims, 4 Drawing Sheets

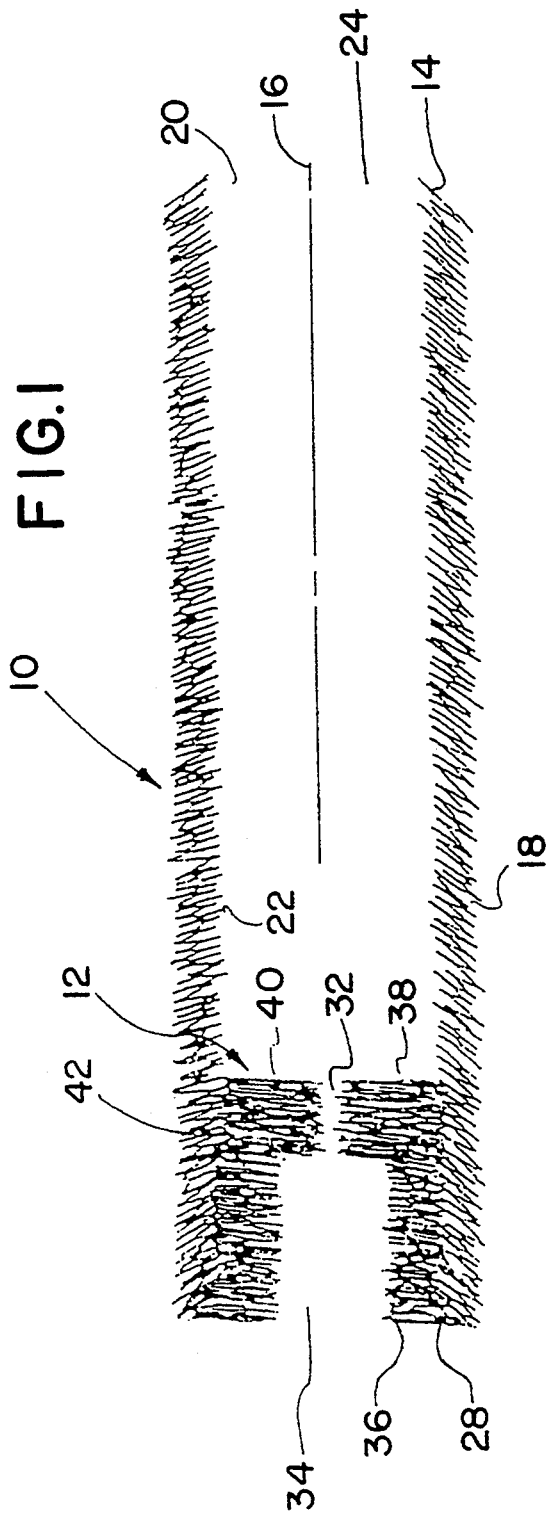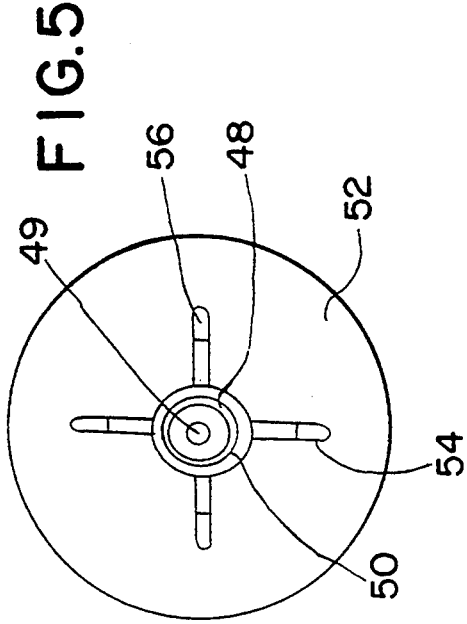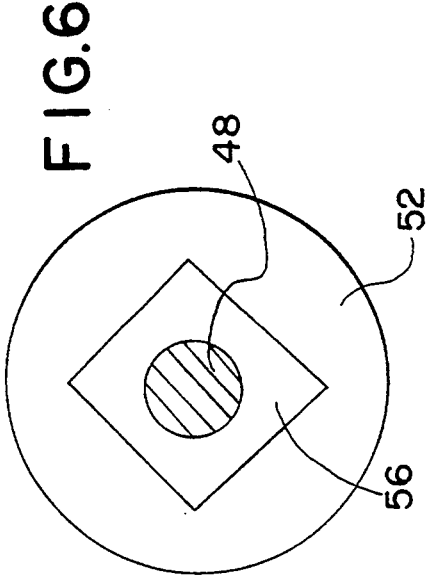

HYBRID END CLOSURE FOR SHIRRED FOOD CASING

BACKGROUND OF THE INVENTION

This invention relates to tubular food casings of the type commonly used to encase food products such as sausages. Such casings are often provided to the meat packer in the form of shirred strands, i.e. tubular food casing which is folded and compressed along its longitudinal axis so as to provide from 25 to 200 length units of uncompressed casing per single length unit of the shirred strand.

Such strands have a hollow longitudinal bore which can be placed over a stuffing horn of a food stuffing machine and filled with the desired food product such as sausage meat. During the stuffing operation food casing is "deshirred" from the shirred casing strand until essentially all of the tubular film contained in the shirred strand has been deshirred and stuffed. In order for the stuffing operation to proceed as described above, the leading end of the tubular food casing must be closed in some way. In the absence of such a closure, food product would simply pass completely through the strand, be spilled and lost without deshirring the casing. Numerous types of end closures have been tried for this purpose such as ties, knots, clips, twisted arbor closures, e.g. as described in U.S. Pat. No. 4,536,175, and axially compressed end closures, e.g. as described in U.S. Pat. No. 4,551,370. A problem encountered with end closures has been that gas may become trapped between the food product and the end closures. In order to alleviate that problem arbor end closures have been provided with vents which are easily formed as the twisting arbor is removed from the end closure. Such a vented arbor (gripper) type end closure may for example be seen in U.S. Pat. No. 5,088,956. The vents in the arbor type end closures have been beneficial in permitting gas to escape from the food casing during the stuffing operation. Unfortunately arbor type end closures have had other disadvantages. In particular arbor type end closures generally do not tightly contact the sidewalls of the bore along the entire length of the twisted plug forming the closure and can thus accommodate less force than compression type end closures before blowing out thus creating unsanitary conditions, manufacturing down time and lost food product. Furthermore arbor type end closures tend to be conical in shape and can sometimes be forced off center by impinging food product thus causing an asymmetrical end on the initial stuffed food product and also possibly closing any existing vent or causing a failure of the end closure and subsequent loss of food product and equipment down time.

Up to now compression type end closures have not been provided with vents which is due both to the lack of recognition that they could be because the act of compression would close any formed vent and further without twisting, even if a vent could be formed, it would tend to collapse because of stress applied against it by surrounding compressed casing. In addition, compression type end closures have not been forward strippable, i.e., it has not been possible to easily remove meat product through the end having the end closure by unraveling the end closure.

A further disadvantage of both arbor type end closures and compression type end closures is that the force to push out the end closure is not consistent from one strand to another. This makes it difficult to manufacture a consistent stuffed casing end product.

BRIEF DESCRIPTION OF THE INVENTION

It has not been previously recognized that a hybrid type end closure could overcome the disadvantages of both arbor type closures and compression type closures, nor has any satisfactory method for manufacturing such an end closure been known since the compression operation would close any formed vent and since such vent holes are normally formed by a twisting operation such as encountered in the manufacture of arbor type end closures.

In accordance with the invention there is therefore provided a hybrid type end closure having a vent which has desirable characteristics of both arbor and compression closures, i.e. has the advantages of a vent and forward strippability while having higher push out force than arbor type end closures.

More particularly the invention comprises a shirred food casing strand comprising tubular film food casing compressed along a longitudinal axis of the tubular film to form a compressed pleated strand. The strand has an internal longitudinal bore defined by sidewalls formed from said compressed tubular film. The bore has a first open end and the strand is provided with an end closure proximate a second end of the bore and which closes said bore proximate said second end. The end closure comprises a portion of said tubular film compressed within said bore proximate said second end. The compressed film portion has a vent therethrough. The compressed film portion tightly circumferentially contacts the walls of said bore at the location of the end closure and is hollow at one end of the compressed film portion and has an essentially flat surface at another end of the compressed film portion opposite the hollow end, said flat surface facing the first open end of said bore.

In a preferred embodiment, the vent is defined by radially twisted tubular film and the balance of the end closure is formed from tubular film compressed along its longitudinal axis in the absence of significant radial twisting.

The invention further comprises a method for manufacturing the hybrid end closure within a shirred tubular food casing strand.

BRIEF DESCRIPTION OF THE DRAWINGS

FIG. 1 shows a cross sectional view of a shirred casing strand having the end closure of the invention.

FIG. 5 shows an end view of the blades of the friction gripper, hold back disc, push rod and pin taken on 5—5 of FIG. 2 without the strand.

FIG. 6 shows an end view of the hold back disc, rear of the friction gripper and radial cross section of the push rod, as taken on 6—6 of FIG. 2.

DETAILED DESCRIPTION OF THE INVENTION

Figure 2:
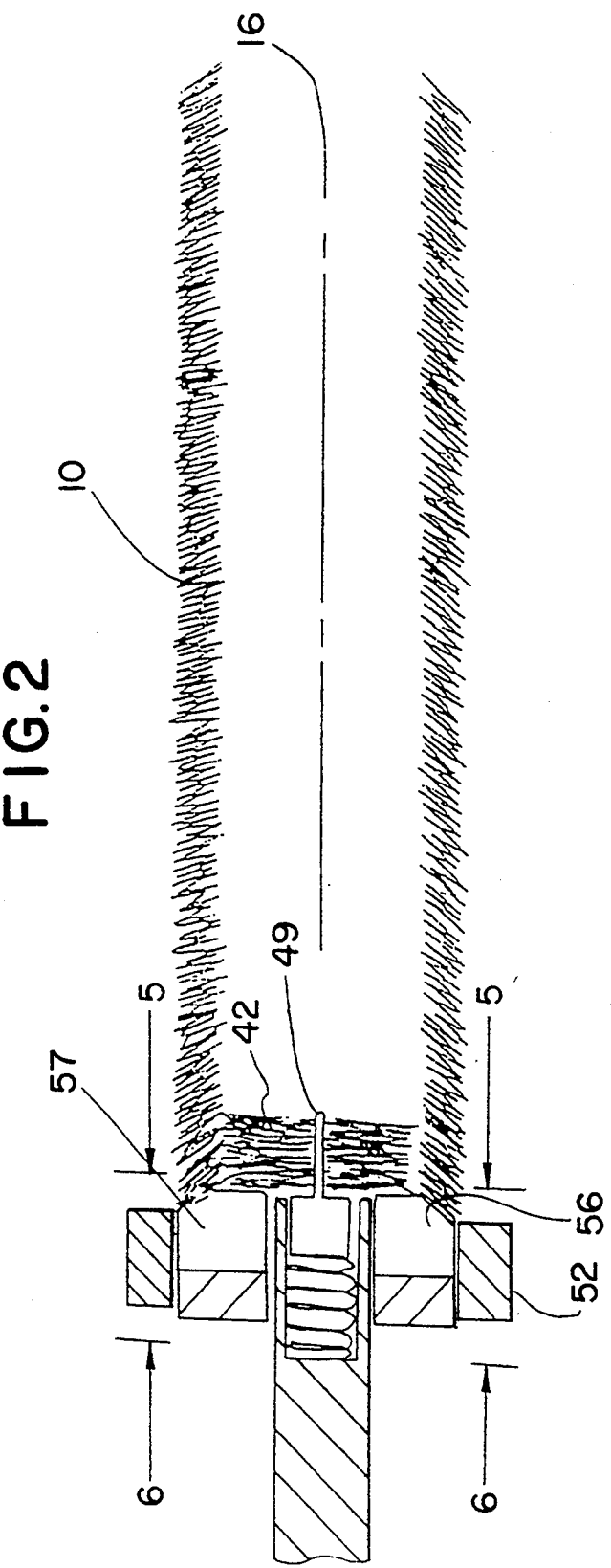
FIG. 2 shows a shirred casing strand undergoing a first step in forming the end closure of the invention.

As best seen in FIG. 1, a shirred casing strand 10 is shown having a hybrid end closure 12. The strand 10 comprises a tubular food casing 14 compressed along a longitudinal axis 16 to form the strand having compressed pleats or folds 18. The strand has an internal longitudinal bore 20 defined by sidewalls 22 formed from internal folds of pleats 18. The bore 20 has a first open end 24 and the strand is provided with an end closure 12 proximate second end 28 of bore 20 which closes the bore proximate the second end 28, i.e. from bitter end of end 28 to within about two inches from the bitter end. The end closure comprises a portion 30 of tubular film 14 compressed within the bore 20 proximate second end 28 and the compressed film forming the end closure 12 has a vent 32 therethrough. The compressed film of the end closure 12 tightly circumferentially contacts walls 22 of of bore 20 at the location of the end closure. In accordance with the present invention the end closure 12 is provided with a depression or hollow 34 at one end 36 of end closure 12 and an essentially flat surface 38 at an end 40 of end closure 12 opposite the hollow end 36. The flat surface 38 faces first open end 24 of bore 20. In accordance with a preferred embodiment of the present invention vent 32 is defined by radially twisted tubular film 42 and the balance of the end closure is formed from tubular film compressed along its longitudinal axis 16 which, in a preferred embodiment is not significantly radially twisted; although, some twisting may be optionally employed to vary end closure push out or deshirring force.

In accordance with the invention a method is provided for manufacturing the shirred food casing of the invention having the novel end closure. Shirred casing is made in accordance with methods known to those skilled in the art such as for example are described in U.S. Pat. Nos. 4,339,894; 4,320,558; and 4,377,885.

Figure 3:
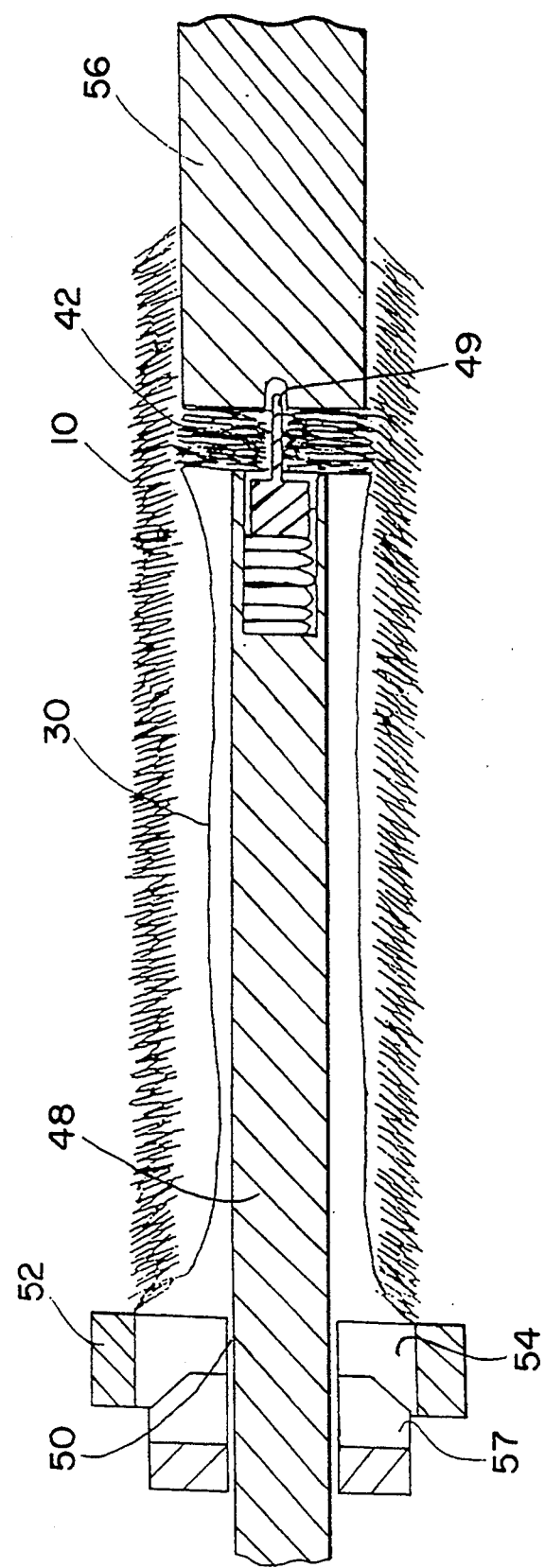
FIG. 3 shows a shirred casing strand undergoing a second step in forming the end closure of the invention.
Figure 4:
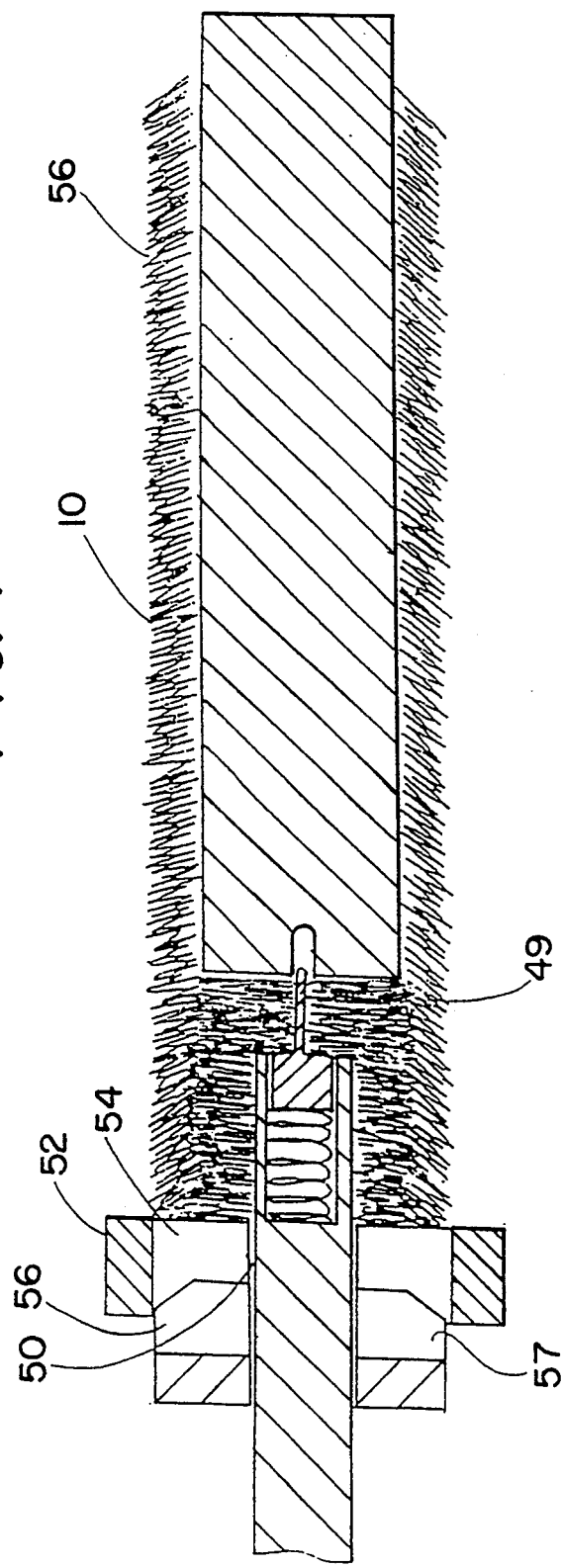
FIG. 4 shows a shirred casing strand undergoing a third step in forming the end closure of the invention.

A push rod 48 having a protruding vent forming pin 49, as seen in FIGS. 2–4, is centered in a hole 50 in a hold back disc 52. The hold back disc is provided with slots 54 which radiate from hole 50. Push rod 48 is centered in an open end 28 and blades 57 of friction gripper 56 are pushed through slots 54 to contact the end of pleats 18. Disc 52 is then turned about axis 16 which causes gripper 56 to rotate which causes blades 57 to picks up casing at end 26 and wrap it around pin 49. Grippers 56 are then withdrawn from slots 54 and push rod 48 is advanced into the bore 20 of casing 10 thus extending a portion 30 of casing, deshirred from end 26, into bore 20.

A packrod 56 then advances from open end 24 of the shirred casing strand toward push rod 48 and compresses twisted casing 42. Packrod 56 is preferably provided with an indent 58 which accommodates pin 49 during such compression to assist in forming and maintaining vent 32. After such compression of twisted casing 42, packrod 56 continues to advance toward end 26 and push rod 48 retracts from end 26 at a speed corresponding to the advance speed of packrod 56. As a result casing 30 becomes pleated and compressed about push rod 48 and against walls 22 of bore 20 because disc 52 will not let casing be withdrawn with push rod 48. As a result the casing of the invention having the novel end closure of the invention is formed.

End closures of the invention were compared with end closures known in the art. In particular regenerated cellulose food casings commonly used for the manufacture of "hot dog" type sausages were shirred essentially as described in U.S. Pat. No. 4,339,894 to form shirred casing strands. End closures were formed in a first set of such strands in accordance with the present invention. End closures having a vent were formed in a second set of such strands using the arbor type method previously described and unvented "Push Pack" type end closures wherein casing is deshirred and twisted and compressed within the bore of the casing were formed in a third set of such strands. In each case below the strands were aged at least 24 hours before the push out force (force to remove the end closure from within the casing) was determined.

The results are set forth in Table I.

TABLE I

| End Closure | Pushout Force Average | Number of Strands | Standard Deviation | Max | Min |
|---|---|---|---|---|---|
| 1. | | | | | |
| 3 twist | 4.04 | 25 | 0.66 | 5.7 | 3.15 |
| 1. | | | | | |
| 5 twist | 4.29 | 10 | 0.28 | 4.65 | 3.85 |
| 2. | 2.73 | 465 | 2.26 | | |
| 3. | 5.54 | 50 | 1.81 | | |

As can be readily seen from the Table I, the push out force for the end closure of the invention is much greater than for an arbor type end closure and has the advantage of being vented when compared with the push pak type end close. In addition the consistency of the push out force of the closure of the invention is much better than either the arbor type end closure or the push pak type end closure.

What is claimed is:

1. A shirred food casing strand comprising tubular film food casing compressed along a longitudinal axis of the tubular film to form a compressed pleated strand, said strand having an internal longitudinal bore defined by sidewalls formed from said compressed tubular film, said bore having a first open end and the strand being provided with an end closure proximate a second end of the bore and which closes said bore proximate said second end, the end closure comprising a portion of said tubular film compressed within said-bore proximate said second end and said compressed film portion having a vent therethrough, the compressed film portion tightly circumferentially contacting the walls of said bore at the location of the end closure and the compressed film portion being hollow at one end and having an essentially flat surface at another end of the compressed film portion opposite the hollow end, said flat surface facing the first open end of said bore.

2. The shirred strand of claim 1 wherein said vent is defined by radially twisted tubular film and the balance of the end closure is formed from tubular film compressed along its longitudinal axis in the absence of significant radial twisting.

3. A method for the manufacture of a shirred food casing strand of claim 1 comprising:
   compressing a tubular food casing along a longitudinal axis on a mandrel to form a shirred strand having a hollow bore,
   removing the shirred strand from the mandrel,
   centering a push rod having a protruding vent forming pin in a hole in a hold back disc, said hold back disc being provided with slots which radiate from said hole,
   centering said push rod in said second end of said casing which is open prior to formation of the end closure, pushing friction grippers through said slots in said disc to contact pleats at said second end, turning said disc about axis the longitudinal axis of the casing to pick up casing at said second end and twist it around said pin, withdrawing said grippers from said slots, advancing said push rod into the bore of said casing through the second end thus extending a portion of casing, deshirred from said open end, into said bore, advancing a packrod through the bore from the first end of the shirred casing strand toward said push rod thus compressing the casing twisted around said pin, after such compression of twisted casing, continuing to advance the pack rod toward the second casing end while withdrawing said push rod from said second end at a speed corresponding to speed of advance of said packrod, and maintaining said extended portion within the bore during the withdrawal of the push rod by means of said disc, thus pleating the extended portion of said casing and compressing said extended portion about said push rod and against the walls of the bore of the casing.

4. The method of claim 3 wherein the packrod is provided with an indent which accommodates said pin during compression of said twisted casing to assist in forming and maintaining said vent.

* * * * *